United States Patent [19]
Harrell et al.

[11] 4,353,647
[45] Oct. 12, 1982

[54] APPARATUS FOR EXPOSING AND CONVEYING PHOTOSENSITIVE PLATES

[75] Inventors: Robert E. Harrell, Manchester; Tedd L. Harrell, Springfield; Harold E. Coons, Jr., St. Charles, all of Mo.

[73] Assignee: Western Litho Plate & Supply Company, St. Louis, Mo.

[21] Appl. No.: 223,317

[22] Filed: Jan. 8, 1981

[51] Int. Cl.³ ............................................. G03B 27/04
[52] U.S. Cl. ........................................ 355/85; 355/91; 355/99
[58] Field of Search ................... 355/78, 79, 91, 94, 355/102, 103, 85, 72, 73, 99, 86, 87

[56] References Cited

U.S. PATENT DOCUMENTS

| | | | |
|---|---|---|---|
| 3,263,587 | 8/1966 | Mey et al. | 95/76 |
| 3,635,559 | 1/1972 | Harrell et al. | 355/85 |
| 3,771,869 | 11/1973 | Diehl et al. | 355/94 |
| 3,810,694 | 5/1974 | Harrell et al. | 355/18 |
| 4,082,455 | 4/1978 | Brigham | 355/100 |
| 4,178,097 | 12/1979 | Sara | 355/100 |

Primary Examiner—Joseph W. Hartary
Assistant Examiner—Alan Mathews
Attorney, Agent, or Firm—Senniger, Powers, Leavitt and Roedel

[57] ABSTRACT

Apparatus for exposing lithographic plates to light through a film, e.g. a negative, adapted for exposing a plurality of plates to light through the same film, having a conveyor with grippers for conveying a plate with a film thereon to an exposure station, where a window comes down on the film and plate, the grippers being opened to allow the window to vacuum-lift the film off the plate and retain it while another plate is conveyed to the exposure station for exposure through the retained film.

18 Claims, 13 Drawing Figures

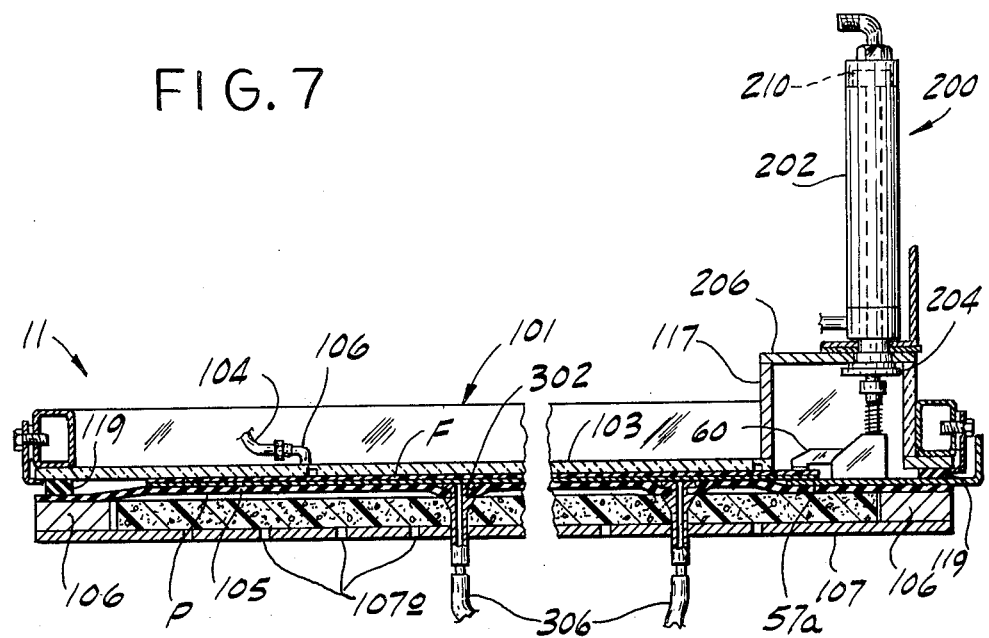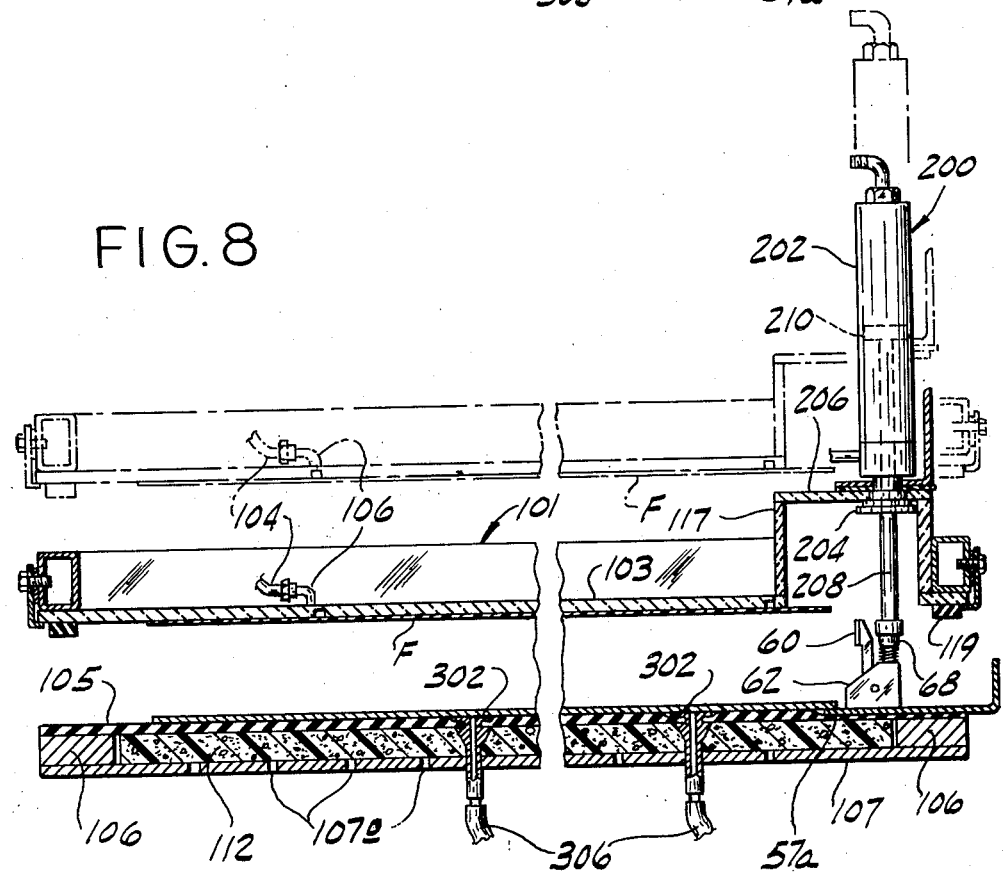

APPARATUS FOR EXPOSING AND CONVEYING PHOTOSENSITIVE PLATES

BACKGROUND OF THE INVENTION

This invention relates to photographic printing apparatus, and more particularly to apparatus for automatically carrying photosensitive plates, and especially lithographic plates, through exposure operations.

The invention involves an improvement on the photographic printing apparatus shown in the coassigned U.S. Pat. No. 3,810,694, of Robert E. Harrell et al., issued May 14, 1974, entitled Photograhic Printing Apparatus, which in turn is an improvement on the photographic printing apparatus shown in the coassigned U.S. Pat. No. 3,635,559 of Robert E. Harrell et al., issued Jan. 18, 1972, entitled Photographic Printing Apparatus.

SUMMARY OF THE INVENTION

Among the several objects of this invention may be noted the provision of an improved photographic printing apparatus of the type shown in said U.S. Pat. No. 3,810,694, particularly for exposing lithographic plates, adapted for automatically effecting exposure of the plates to light through a film (negative or positive) and efficiently to provide for exposing a plurality of plates (two or more) to light through the same film; and the provision of such apparatus adapted automatically to handle a film during and after the exposure of the requisite number of plates through the film.

In general, apparatus of this invention, which is adapted to carry out the exposure of photosensitized plates, e.g. lithographic plates, to light through a film (e.g. a negative) comprises, as in the apparatus shown in U.S. Pat. No. 3,810,694, a conveyor having gripping means spaced at intervals along its length each adapted releasably to grip a plate and a film on the plate for movement of the plate and a film on the plate by the conveyor in a forward direction along a predetermined path, the conveyor being intermittently operable to index each gripping means from a first station for application of a plate and film thereto to a second station along said path for bringing the gripped plate and film to an exposure position and thence to a third station farther along said path for discharge of the plate, means including a window movable downwardly from a raised retracted position clear of a plate and film in the exposure position at the second station to a lowered position for the pressing of the plate and film, and movable upwardly from its lowered to its raised position. The improvement involved in this invention comprises the provision of means for actuating the gripping means on the conveyor at the second station operable to open the gripping means to allow a film on a plate at the second station to be lifted from the plate, and means associated with the window operable on raising it to grip a film on a plate at the second station and lift the said film away from the plate to a raised position clear of the plate. The means for actuating the gripping means is operable to close the gripping means on a plate at the second station after the said film has been lifted from the plate to enable the conveyor to index the plate to the third station and bring the next plate to the second station for exposure, the window then being movable down to its lowered position for the pressing of the said film and the next plate and the exposure of said next plate through said film.

Other objects and features will be in part apparent and in part pointed out hereinafter.

BRIEF DESCRIPTION OF THE DRAWINGS

FIG. 7 is an enlarged vertical section on line 7—7 of FIG. 3, with parts broken away to reduce the width of the view, showing the window down;

FIG. 8 is a view similar to FIG. 7 showing in solid lines the window gripping a film and partially raised, and in phantom the window gripping the film and fully raised;

Corresponding reference characters indicate corresponding parts throughout the several views of the drawings.

DESCRIPTION OF THE PREFERRED EMBODIMENT

Figure 1:
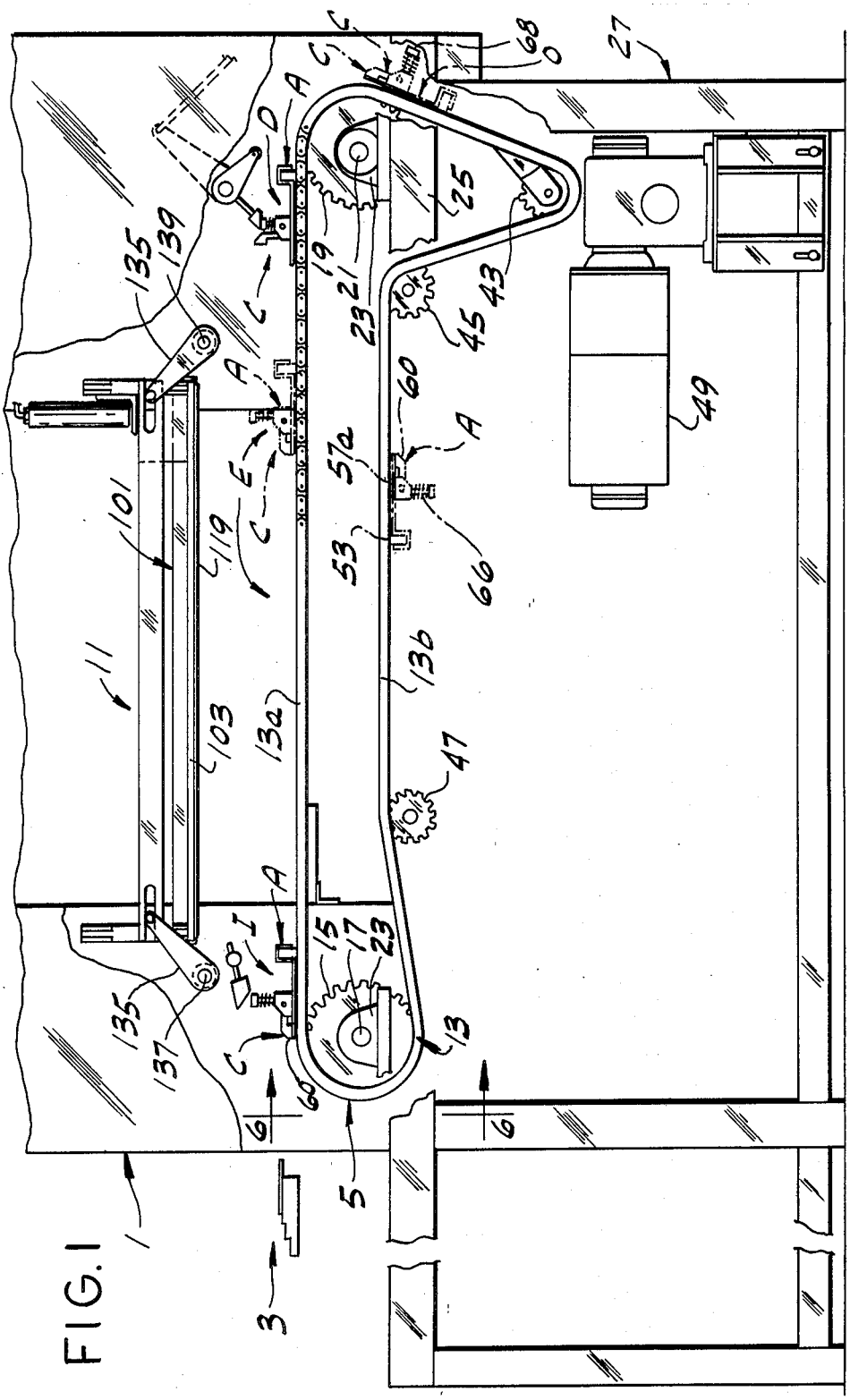
FIG. 1 is a side elevation, with parts broken away, showing a lithographic plate exposure apparatus of this invention, with a vacuum frame or exposure window of the apparatus in its raised position.

The present invention involves certain modifications of and additions to the apparatus shown in the aforesaid U.S. Pat. No. 3,810,694, the disclosure of which is incorporated herein by reference. In accordance with Rule 1.71(c) the ensuing description will, insofar as possible, be confined to the specific improvement and to such parts of the apparatus shown in said U.S. Pat. No. 3,810,694 as necessarily cooperate with it or as may be necessary to a complete understanding or description of it.

In accordance therewith, there is generally shown in the drawings a photographic printing apparatus which is basically the same as the apparatus shown in U.S. Pat. No. 3,810,694 comprising a housing such as generally indicated at 1 which has a work registration and feed table means at 3 at one end thereof constituting its input or entrance end. A conveyor generally designated 5 is provided for conveying a lithographic plate P with a film F thereon (e.g. a negative) through the housing from a first station I adjacent its input or entrance end (which is at the left as viewed in FIG. 1) to a second station E and thence to a third station D adjacent the other end of the housing constituting its discharge or exit end. The conveyor 5 is an endless conveyor carrying a plurality of sets of gripping means or clamps, each set corresponding to a set A of clamps C as shown in said U.S. Pat. No. 3,810,694, but with each clamp of modified construction as will appear.

Figure 2:
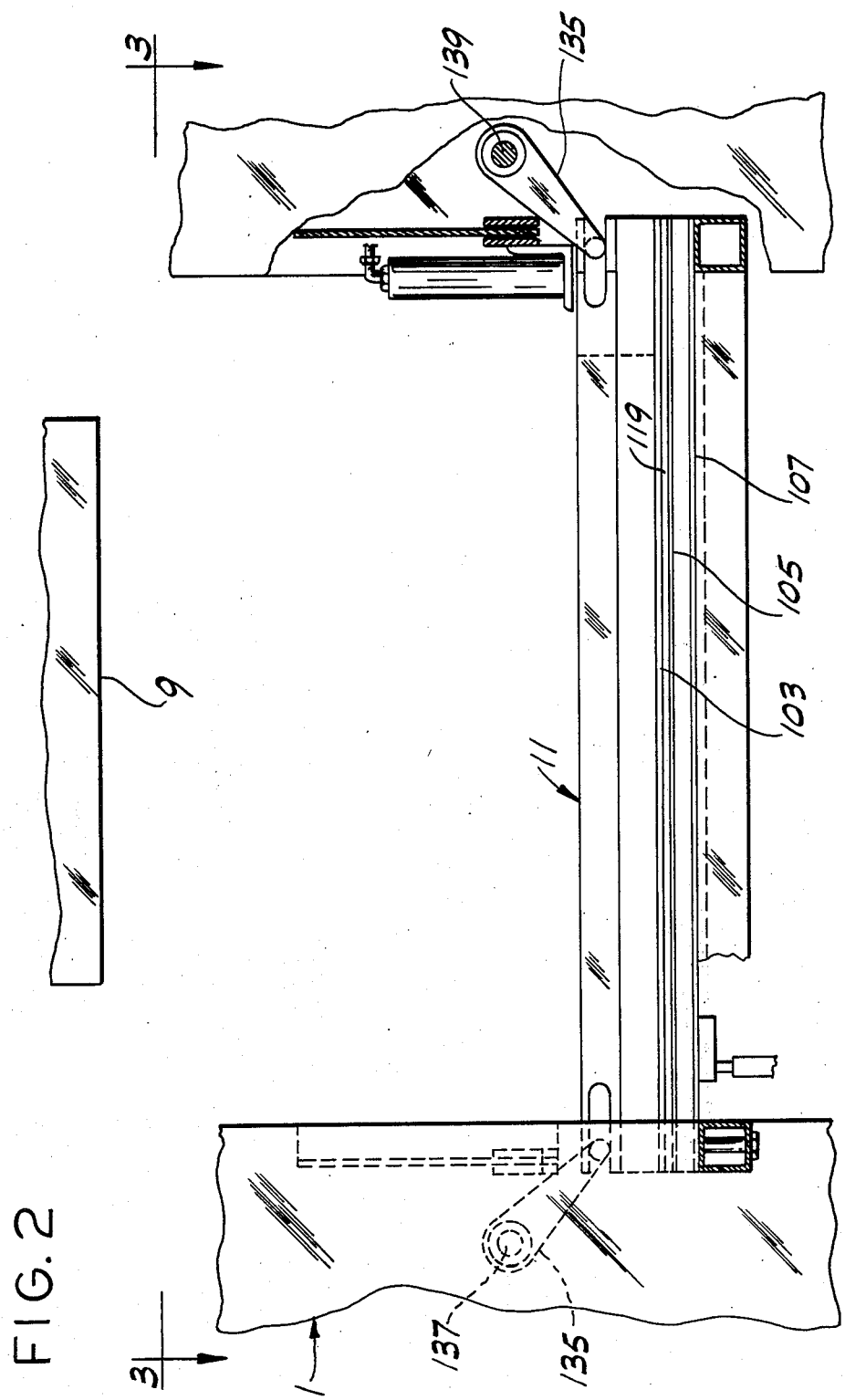
FIG. 2 is an enlarged fragment of FIG. 1, with parts broken away and shown in section, showing the window in its lowered position.
Figure 3:
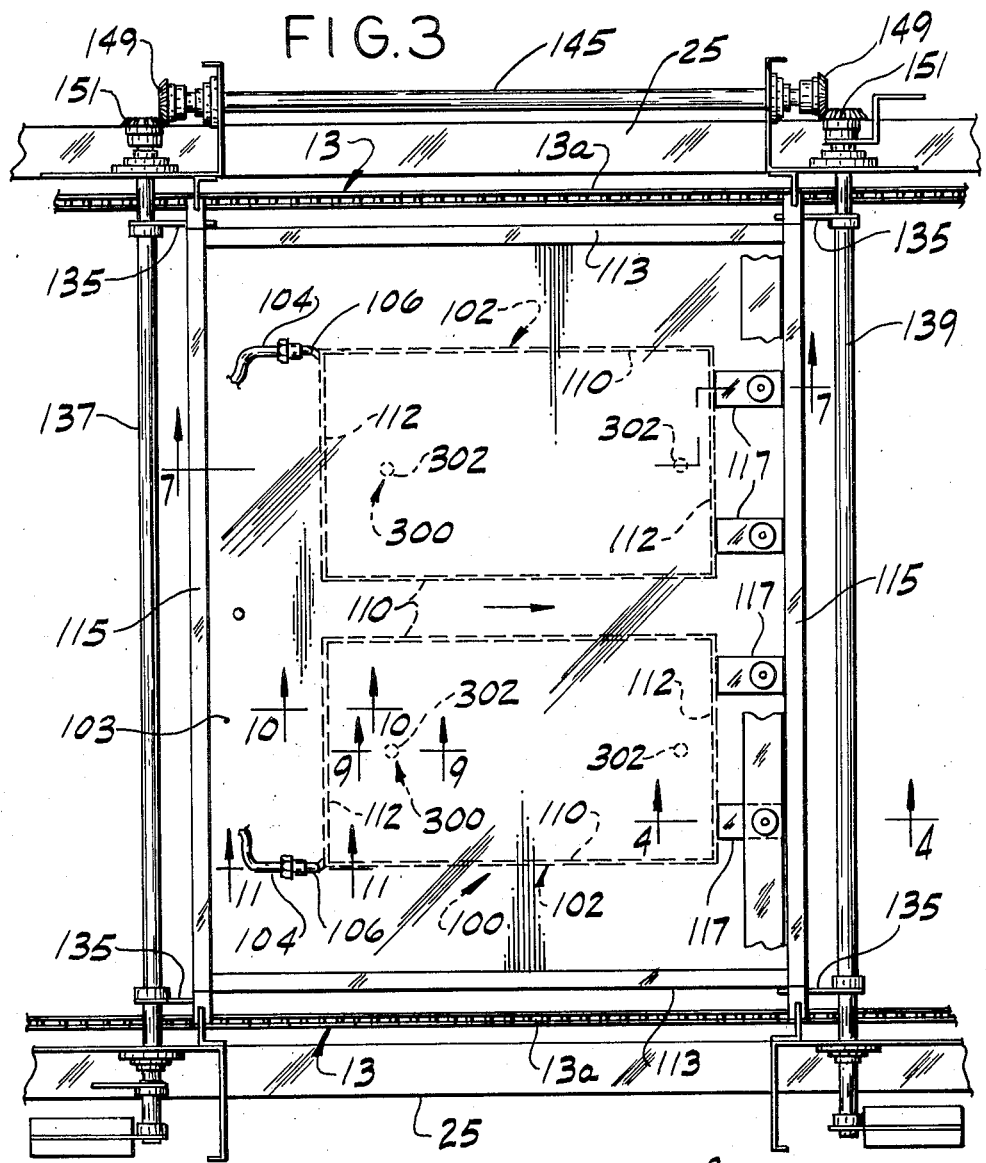
FIG. 3 is a plan on line 3—3 of FIG. 2, on a smaller scale than FIG. 2, showing the window.
Figure 6:
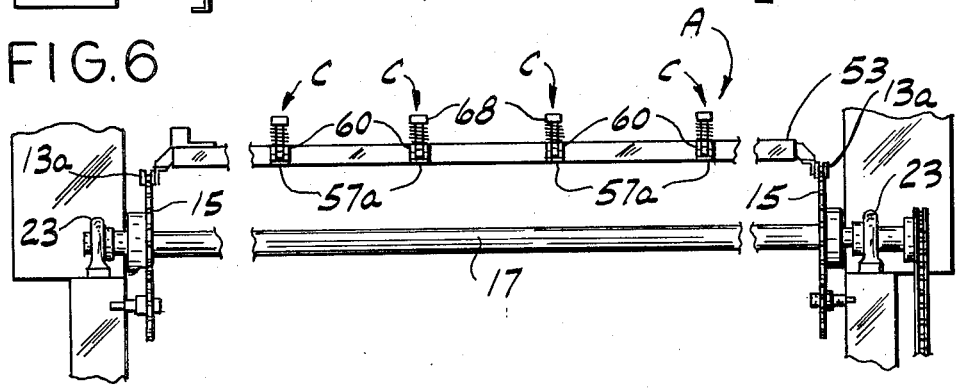
FIG. 6 is a view generally on line 6—6 of FIG. 1 illustrating a set of clamps of the apparatus.

Each set A, as herein illustrated, comprises four clamps C, two left-hand clamps and two right-hand clamps (see FIG. 6). "Left" and "right" are as viewed in the direction of travel of the upper reach of the conveyor. The two left-hand clamps are for clamping a single-size plate (and film) at the left, the two right-hand clamps are for clamping a single-size plate (and film) at the right. All four would be utilized for clamping a double-size plate (and film). The references to "single-size" and "double-size" are with regard to single newspaper pages and two newspaper pages. The sets A of gripping means or clamps C are spaced at equal intervals along the length of the conveyor, each set being adapted releasably to grip a plate P and a film F (e.g. a negative) on the plate for movement of the plate and a film on the plate by the conveyor in a forward direction along a predetermined path. The conveyor is intermittently operable to index each set A forward along said predetermined path, which is a horizontal path, from the first station I (the input station) to the second station E (the exposure station) along said path, and thence to the third station D (the discharge station) farther along said path. As will appear from U.S. Pat. No. 3,810,694, a plate P with a film F thereon is delivered to the set A of clamps or gripping means C at the first or input station I and gripped thereby. The set A is then indexed to station E, dragging the gripped plate and film to exposure position for exposure of the plate to light via a light source such as indicated at 9 in FIG. 2 mounted at the top of housing. The set A is then indexed to station D, dragging the exposed plate to a position for removal of the film from the plate, if it has a film thereon, followed by indexing of the conveyor to move the set A to a clearance position as indicated at O and forward feed of the plate out of the discharge end of the housing to the discharge conveyor shown at 7 in U.S. Pat. No. 3,810,694. The apparatus is particularly useful for exposing aluminum lithographic plates having a light-sensitive coating on one surface thereof, such as are widely used, for example, in newspaper printing, but may be used for exposing photographic plates other than lithographic plates. Light from the light source 9 is transmitted to the plate through the film. Exposure is via the light-transmitting vacuum frame means 11 in the housing 1 for pressing the platefilm assembly dragged into exposure position by the stated set of clamps A when the latter has been indexed to station E.

The conveyor 5 corresponds to that shown in U.S. Pat. No. 3,810,694, being an endless chain conveyor comprising a pair of parallel endless chains as indicated at 13 trained around sprockets 15 on a horizontal sprocket shaft 17 adjacent the input end of the housing and sprockets 19 on a horizontal sprocket shaft 21 adjacent the output end of the housing. These sprockets shafts are journalled in bearings such as indicated at 23 mounted on side rails 25 of a main frame generally designated 27.

The endless chains 13 have an upper horizontal reach 13a which travels forward (from left to right as viewed in FIG. 1) from sprockets 15 to sprockets 19. The chains extend around and downwardly from sprockets 19 to a set of chain tensioning sprockets 43, thence up and over sets of idler sprockets 45 and 47 in a lower return reach 13b back to sprockets 15. At 49 is indicated the electric motor (a gearmotor) for driving the chains 13 via a chain and sprocket drive such as indicated at 51 in U.S. Pat. No. 3,810,694. Each of the clamp sets A comprises a clamp carrier bar 53 spanning the chains attached at its ends to the chains as in U.S. Pat. No. 3,810,694. These bars 53 are spaced at equal intervals along the length of the chains. Each bar 53 carries the four clamps C on its trailing side, spaced at intervals along the length of the bar.

Figure 4:
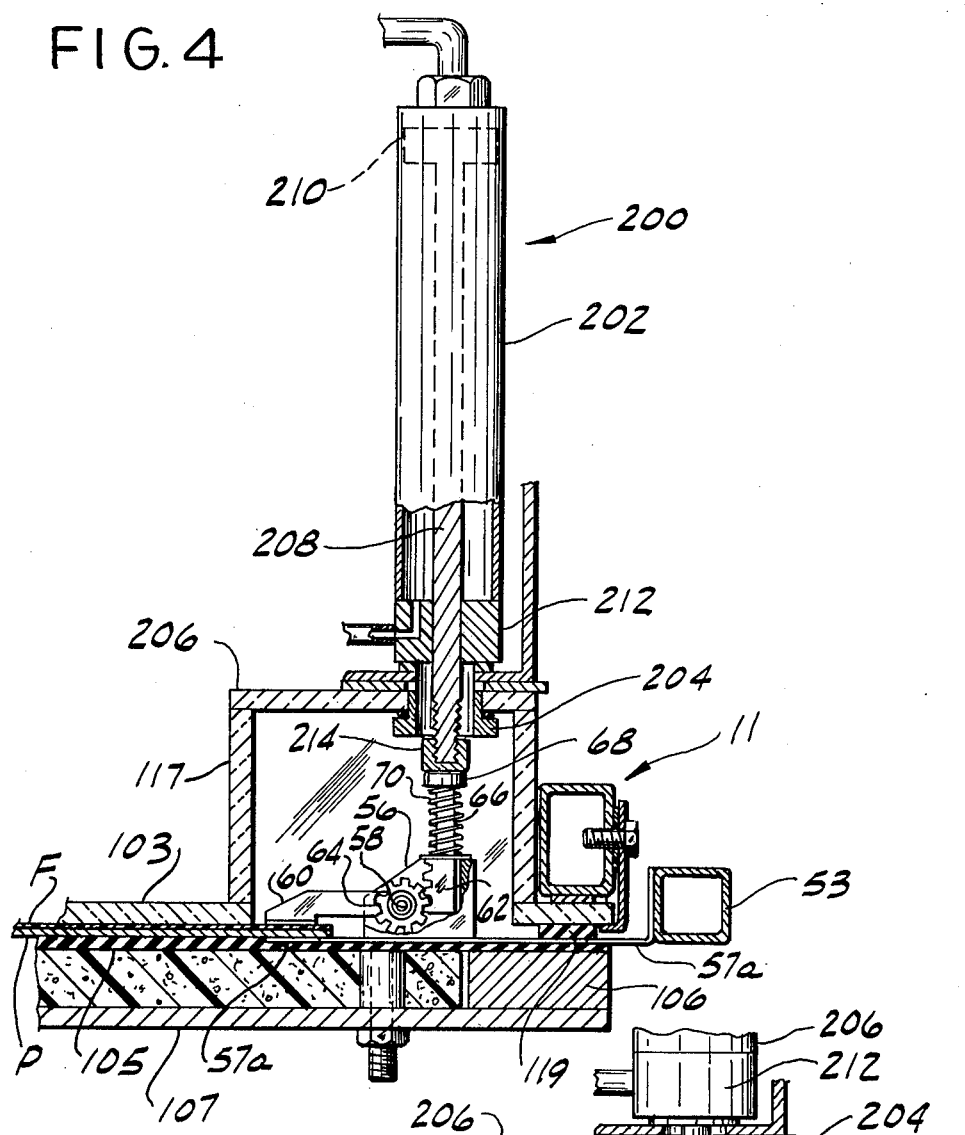
FIG. 4 is an enlarged vertical section on line 4—4 of FIG. 3 showing the window down and a clamp of the apparatus closed and gripping a plate and a film.
Figure 5:
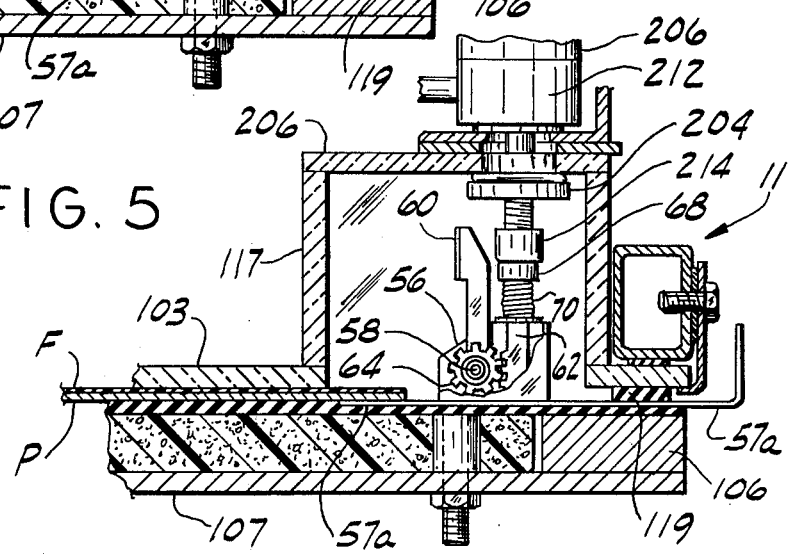
FIG. 5 is a fragment of FIG. 4 showing the clamp open.
Figure 9:
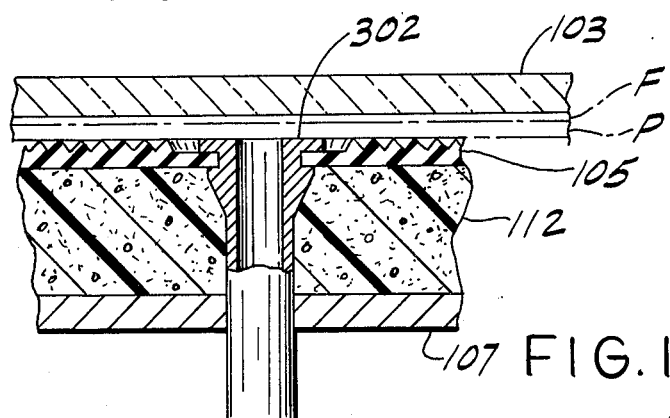
FIGS. 9, 10 and 11 are enlarged vertical sections on lines 9—9, 10—10 and 11—11, respectively, of FIG. 3.
Figure 10:
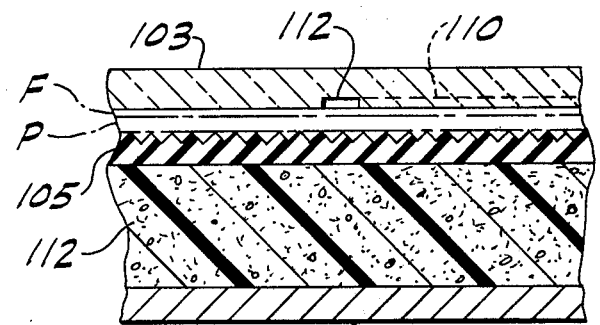
Figure 11:
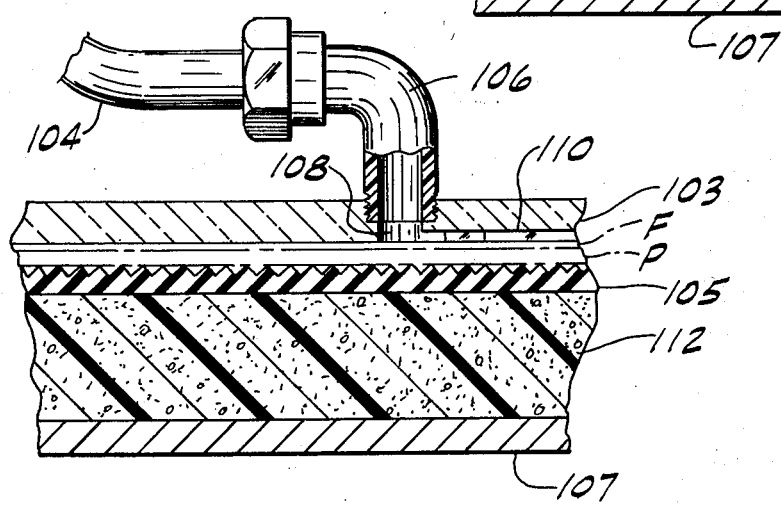

For purposes of this invention, the clamps C are of different construction from the clamps C shown in U.S. Pat. No. 3,810,694. Each comprises a body 56 on a fixed lower clamp member constituted by a metal strip 57a (corresponding to the metal strip 57 shown in U.S. Pat. No. 3,810,694), this strip 57a constituting the base or lower jaw of the clamp. A shaft 58 journalled in the body has the upper arm or jaw 60 of the clamp secured thereto. This upper clamp arm or jaw is operable by a rack 62 vertically slidable in the body 56 and meshing with a pinion 64 on the shaft. The rack is formed at the lower end of a plunger 66 having a head 68 at its upper end. A coil spring 70 surrounding the plunger reacts from the top of the body 56 against the head to bias the rack to move upward to swing the arm downward to a clamping position (FIGS. 4 and 7) for clamping a film F and plate P against the lower jaw 57a. The plunger 66 is movable downward, as will appear, to swing the upper clamp arm 60 upward to a retracted position as shown in FIGS. 5 and 8 wherein it extends upward from the shaft 58 at a sufficient angle to the lower jaw (vertically upward as shown in FIGS. 5 and 8) to allow a film to be lifted vertically up and away from a plate P.

Station I for the clamp carrier bars 53 is located slightly forward of the rearward end of the upper horizontal working reach 13a of the main conveyor 5, and station D is located slightly rearward of the forward end of the upper reach 13a. In this respect, the term "rearward" is used herein in reference to the input end of the upper working reach 13a of conveyor 5 and the term "forward" is used in reference to the exit end. Bars 53 are spaced on the chains 13 a distance corresponding to the spacing of stations I and D, and there are three such bars (and three clamp sets A) as in U.S. Pat. No. 3,810,694.

The pressing means 11 is constituted by a vacuum frame unit comprising a window assembly 101 having a light-transmitting window panel 103 (of transparent plastic, for example, such as an acrylic resin), and a flexible resilient presser pad or blanket 105 below the window adapted for vacuum pressing of a plate and a film therebetween, similar to what is shown in U.S. Pat. No. 3,810,694. The blanket 105, which may be made of a suitable rubber, is of rectangular shape in plan, and overlies and open rectangular frame 106 mounted in horizontal position on a horizontal supporting plate 107 at such an elevation that bars 53 moving along the path of the upper flights 13a of chains 13 travel above and closely adjacent the upper surface of the blanket 105. The blanket is cemented to the end members of the open frame 106, being free of the frame between its ends so that it is adapted to flex upward from the frame 106 under a vacuum condition as will appear. Normally, the blanket lies flat on the frame and on an open-cell foam filler 112 (e.g. rubber or polyurethane foam (lying on the plate 107 within the frame 106. The plate 107 has openings 107o for passage of air (filler 112, being of open-cell foam, also permitting passage of air).

As in U.S. Pat. No. 3,810,694, the window assembly 101 comprises an open rectangular window frame 113, 115 carrying the light-transmitting transparent plastic window 103. The latter has upwardly recessed portions 117 adjacent its forward end to accommodate the clamps C. There being four clamps C on each bar 53, there are four such clamp-accommodating recesses 117. The latter may also be referred to as downwardly opening clamp-accommodating chambers. The window assembly 101 is mounted for vertical movement toward and away from the top surface of the blanket 105, and moves between a raised retracted position relative to the blanket as shown in FIGS. 1 and 8 and a lowered closed position as shown in FIGS. 2, 4, 5, 7 and 9–11 wherein peripheral sealing strip 119 adhered to the bottom face of window 103 around all four sides thereof is in air-tight sealing engagement with the blanket around all four margins of the blanket lying on frame 106.

The window assembly 101 is raised and lowered by crank arms 135 on rock shafts 137 and 139, with these rock shafts interconnected for conjoint movement by a countershaft 145 and bevel gearing 149, 151, all in the same manner as disclosed in U.S. Pat. No. 3,810,694.

In accordance with this invention, the window 103 is provided with means operable on raising it to grip the film on an exposed plate P at the second station (the exposure station) and lift the film away from the plate to a raised retracted position clear of the plate at the second station to allow the conveyor 5 to move the exposed plate to the third station D for discharge of the exposed plate and to bring the next plate to the second station for exposure. The window 103 (having the film gripped thereto on its lower face) is then movable down for pressing the film and the next plate at the second station for exposure of the said next plate through the film. This sequence may be repeated to expose as many plates as desired through the same film. On exposure of the last plate, the film is allowed to remain on the plate, is gripped together with the plate by the clamps at position E, and both the film and plate are indexed to station D where the film is removed and the exposed plate discharged in the same manner as in U.S. Pat. No. 3,810,694.

The means for gripping a film F at the second (exposure) station E and lifting the film away from an exposed plate P at station E to a raised retracted position clear of the plate at station E comprises means indicated generally at 100 for vacuum-gripping a film to the bottom of the window 103, and more particularly vacuum recess means 102 in the bottom of the window and means for drawing a vacuum in the recess means. The vacuum recess means is constituted by a pattern of grooves in the bottom of the window 103, and the means for drawing the vacuum in these grooves comprises vacuum line means 104 connected as indicated at 106 to the top of the window 103 and in communication with the grooves through holes in the window such as indicated at 108 in FIG. 11. This vacuum line means 104 is flexible to permit the raising and lowering of the window.

Figure 12:
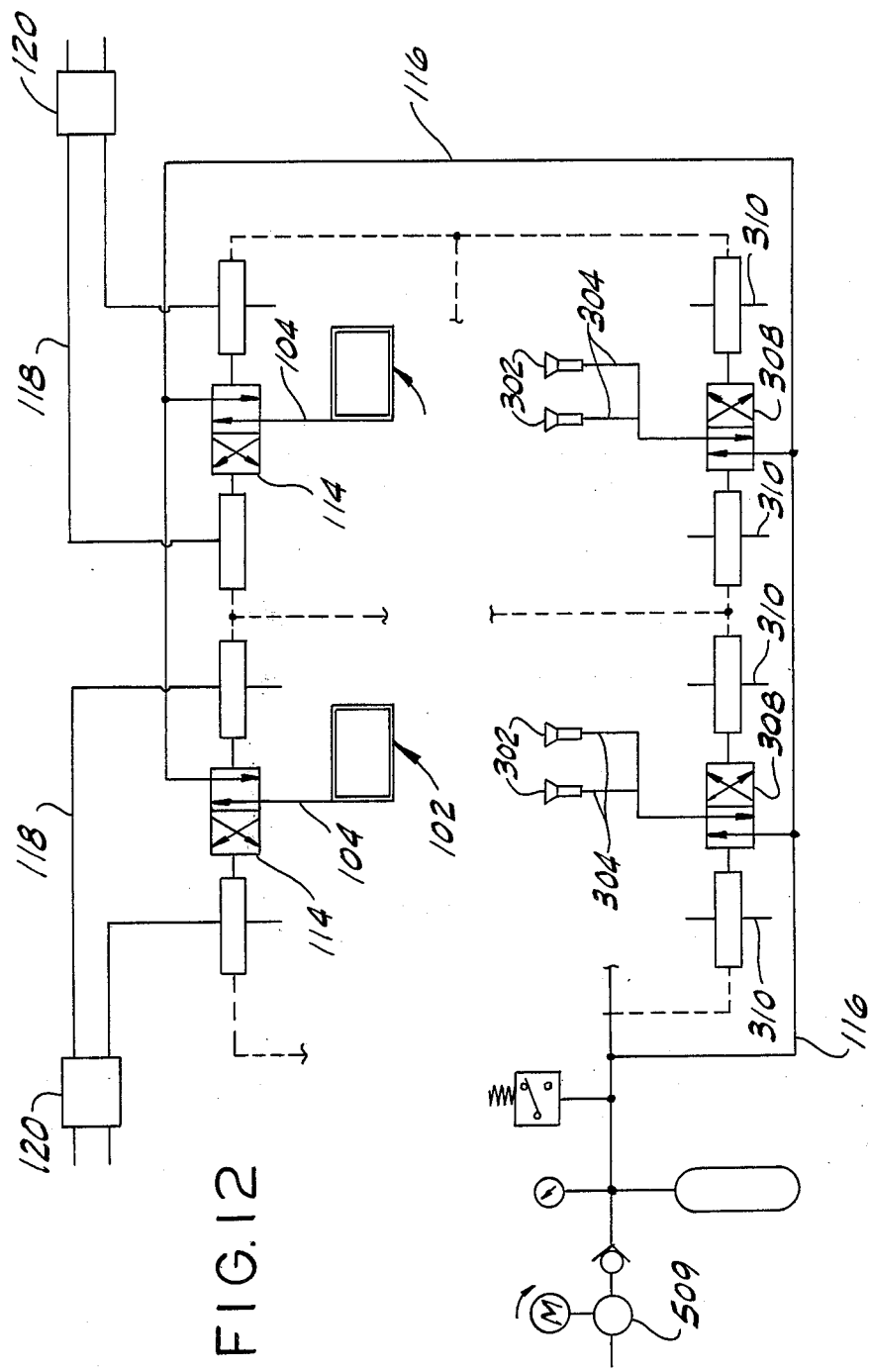
FIG. 12 is a diagram showing certain vacuum components of the apparatus.

As illustrated, the pattern of grooves comprises two sets 102 of grooves, a left-hand set and a right-hand set, arranged side-by-side in the bottom of the window 103, each of the two sets comprising two grooves 110 extending in longitudinal direction and two grooves 112 extending in transverse direction forming a rectangle, with this rectangle slightly smaller than the rectangular outline of a single newspaper page negative for effectively vacuum gripping such a negative adjacent its border without interfering with exposure of a plate through the negative. With two such sets of grooves, the vacuum line means comprises two vacuum lines 104 each connected via a hole 108 in the window 103 to a corner of the respective set of grooves. The left-hand set of grooves 102 is adapted to vacuum-grip a single-size negative, the right-hand set 102 is adapted to vacuum grip a single-size negative, and both sets together may grip a double-size negative. The vacuum lines 104 for these grooves, which may be said to provide the "window vacuum" or "film-gripping vacuum" (since vacuum in the grooves is adapted to grip a film to the window) are under control of solenoid valves such as indicated at 114 in FIG. 12 connected as indicated at 116 to the vacuum pump 509 shown in U.S. Pat. No. 3,810,694. Each solenoid valve is interconnected as indicated at 118 with the controls associated with window 103 in such manner that, upon lowering of the window the vacuum is applied to one or the other or both of the grooves (depending on whether there is a single-size film at the left, or a single-size film at the right, or a double-size film). Upon raising of the window, the vacuum is maintained to vacuum-grip the film (or films if both left and right sides are being utilized) to the bottom of the window, and the vacuum remains on until the window is lowered for exposure of the last plate (or plates) to be exposed through the film (or films). The control here is illustrated in FIG. 12 as via a left-side and a right-side exposure counter 120, the operation being such that upon a pre-set number of exposures having been made at left or right, the respective valve is deactuated to turn off the vacuum in the respective set of grooves 102.

Figure 13:
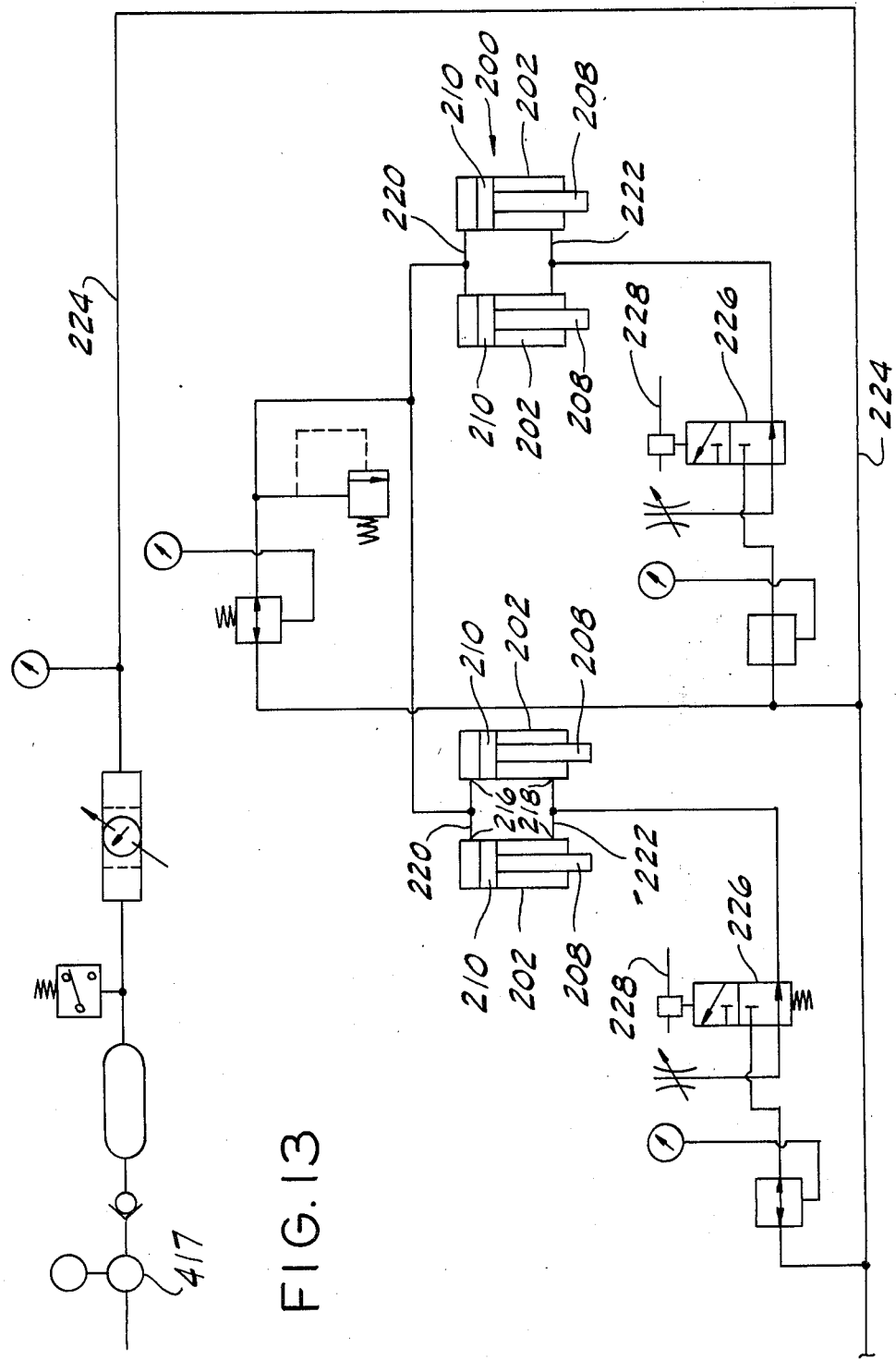
FIG. 13 is a diagram showing certain air cylinders of the apparatus.

Means indicated generally at 200 is provided for actuating the gripping means or clamps C on the conveyor 5 at the second station E, this means being operable to open the clamps and hold them open to allow a film F on a plate P in the second station E to be lifted straight up from the plate. This means 200 is carried by the window 103, comprising a set of air cylinders, one for each of the clamps, each of these cylinders being designated 202. Each cylinder has its lower end mounted as indicated at 204 at the top 206 of a respective clamp-accommodating chamber 117, extending vertically upward therefrom. A piston rod 208 extends down from a piston 210 in the cylinder through the lower end head 212 of the cylinder into the chamber 117, the piston rod having a knob 214 at its lower end engageable with the head 68 of the plunger 66 for actuating the plunger. The piston rod is movable upwardly to a raised retracted position as shown in FIGS. 4 and 7, allowing the plunger 66 to occupy its raised position wherein the upper clamp jaw 60 is closed, and is movable downwardly under pressure of air in the upper end of the cylinder to drive the plunger down and open the clamp jaw 60 (see FIGS. 5 and 8). Each cylinder 202 is a double-acting cylinder having upper and lower ports 216 and 218. The two cylinders at the left are paired, their upper and lower ports being interconnected as indicated at 220 and 222 in FIG. 13. Similarly, the two cylinders at the right are paired, their upper and lower ports being interconnected also as indicated at 220 and 222 in FIG. 13. Each pair is connected as indicated at 224 to the air compressor 417 shown in U.S. Pat. No. 3,810,694 under control of a solenoid valve 226. Each of these valves is interconnected as indicated at 228 with the controls associated with window 103 in such manner that, when only one plate is to be exposed through a negative (meaning that the negative is not lifted) the piston rods 208 remain retracted and the clamps C remain closed. When more than one plate is to be exposed through the same negative (meaning that the negative is vacuum-gripped to the bottom of the window and lifted with the window), air pressure in the upper ends of the cylinders acts to extend the piston rods (i.e. move them down relative to the window) as the window rises, thereby to open the clamps C.

The cylinders 202 are relatively long cylinders, the stroke of their pistons 208 being quite long relative to the stroke of the plungers 66, so that, with air under pressure in the upper ends of the cylinders tending to move the piston rods down, the clamps are held open as the window rises until the piston rods are fully extended and the knobs 214 at their lower ends move up to the point where plungers 66 are released and the clamps close. Then, as the window moves down, the clamps are re-opened.

An exposed plate P may tend to cling to the film F when the film is lifted. Hence, means indicated generally at 300 is provided for gripping a plate down on the top of blanket 105 when a film is lifted from the plate to prevent the plate from being lifted along with the film. This comprises means for vacuum-gripping a plate down on top of the blanket, and more particularly two sets, viz a right-hand set and a left-hand set of vacuum cups 302 inset in the blanket at the top of the blanket as appears in FIG. 9 and means for drawing a vacuum (which may be referred to as the "plate vacuum") in these cups. This means comprises flexible lines 304 connected as indicated at 306 in FIG. 9 to the vacuum cups and as indicated at 116 to the vacuum pump 509 under control of left and right solenoid valves 308 for controlling the vacuum. Each of these solenoid valves is interconnected as indicated at 310 in FIG. 12 with the controls associated with window 103 in such manner that upon lowering of the window, the plate vacuum is applied via cups 302 to hold down a plate on the blanket 105, and when the window is raised the plate vacuum is turned off.

Operation of the apparatus is hereinafter described wth reference to exposure of two single-size plates to one and the same single-size negative on the left side of the apparatus. For such operation, an unexposed single-size plate P and a negative (film F) are registered and gripped in the two left-hand clamps C at station I, and the conveyor 5 is operated to index the plate with the negative thereon over the blanket 105 to the point where the bar 53 carrying the clamps gripping the plate and negative reaches station E, in the same manner as described in U.S. Pat. No. 3,810,694. The window 103 is then lowered, and vacuum ("contact vacuum") is drawn between the window and the blanket 105 to cause the blanket to be forced up by atmospheric air pressure to press the plate and negative up against the window for smoothing purposes, in the same manner as described in U.S. Pat. No. 3,810,694. In addition, for purposes of exposing two plates (one after the other) through the same negative, vacuum ("window vacuum") is drawn in the left-hand set 102 vacuum grooves in the bottom of the window 103, and vacuum ("plate vacuum") is drawn through the left-hand vacuum cups 302. With the plate P and negative F in exposure position at the second station and the window 103 down with vacuum on, the exposure lamp 9 is energized (the same as in U.S. Pat. No. 3,810,694) for its pre-set time interval to expose the plate to light through the negative. When the exposure of the plate has been completed, the window 103 rises. The vacuum between the window and blanket (the "contact vacuum") is cut off, and the space between the window and blanket is vented to allow the window to rise (as in U.S. Pat. No. 3,810,694). The vacuum being drawn through the vacuum cups 302 (the "plate vacuum") remains on, thereby holding the plate P down and keeping it from clinging to the negative and rising when the negative is lifted, as will appear. The solenoid valve 226 for the left-hand pair of air cylinders 202 is operated to actuate these two air cylinders for downward movement of their piston rods 208 to open the two left-hand clamps C. As above noted, jaws 60 of these clamps swing up far enough (to vertical position, as shown in FIG. 5) to enable the film to be lifted vertically off the plate P. The window is raised, the same as in U.S. Pat. No. 3,810,694, except that now the negative F, vacuum-gripped to the bottom of the window 103 via the left-hand set 102 of grooves, is lifted straight up with the window. As the window approaches its fully raised position, clamp jaws 60 are released and swing down to re-grip the plate (which may now be referred to as the "exposed plate"). The plate vacuum drawn through the two left-side vacuum cups 302 is cut off and the vacuum cups are vented to release the exposed plate from the blanket 105. The conveyor 5 is driven to index the exposed plate forward to station D where it stops, in the same manner as described in U.S. Pat. No. 3,810,694. Since there is no film on the plate to pick off, operation of the film pick-off system (vacuum cup lift bar 273 etc.) of U.S. Pat. No. 3,810,694 is omitted. The clamps C at station D are opened, and the conveyor 5 is driven to index the next plate (the second plate) to be exposed to the exposure position, and the exposed plate is discharged via rolls 303 and 325 of U.S. Pat. No. 3,810,694 all as described in U.S. Pat. No. 3,810,694.

When the stated next plate, i.e. the second plate, to be exposed is in exposure position, the window 103 is lowered, bringing the negative back down and on to the stated second plate, the contact vacuum, window vacuum and plate vacuum are applied, and the exposure lamp is energized to expose the stated second plate through the negative. As the window is lowered, piston rods 208, being extended, open the clamps C, with this opening of the clamps occurring as shown in FIG. 8 before the negative comes down to the level where it would be in the way of the upwardly-swinging clamp arms 60. Following this exposure, the window vacuum is released to allow the negative to remain on the second plate, the air cylinders 202 are deactuated with the result that the negative and plate are gripped by the two left-hand clamps C, and then the conveyor 5 is operated to index the plate with the negative thereon to station D. This time, the negative pick-off means of U.S. Pat. No. 3,810,694 is actuated to pick off the negative, then the conveyor is again operated to index it forward, and the said second plate is discharged.

Operation for exposure of more than two plates from the same negative will be apparent from the above. The principle is that for exposure of each additional plate, the clamps or gripping means C are opened to allow the negative F to be lifted from the plate, the negative is gripped to the window, the window is raised, the next plate to be exposed is conveyed to the exposure position, the window (carrying the negative) is lowered, and the next exposure takes place. After the last exposure, the negative remains on the plate, and the negative and plate are clamped by the clamps or gripping means C and moved forward away from the exposure position to the discharge position.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In apparatus for exposing photosensitized plates comprising a conveyor having gripping means spaced at intervals along its length each adapted releasably to grip a plate and a film on the plate for movement of the plate and a film on the plate by the conveyor in a forward direction along a predetermined path, the conveyor being intermittently operable to index each gripping means from a first station for application of a plate and film thereto to a second station along said path for bringing the gripped plate and film to an exposure position and thence to a third station farther along said path for discharge of the plate, means including a window movable downwardly from a raised retracted position clear of a plate and film in the exposure position at the second station to a lowered position for the pressing of the plate and film, and movable upwardly from its lowered to its raised position, the improvement comprising the provision of:

means for actuating the gripping means on the conveyor at the second station operable to open the gripping means to allow a film on a plate at the second station to be lifted from the plate;

means associated with the window operable on raising it to grip a film on a plate at the second station and lift the said film away from the plate to a raised position clear of the plate;

the means for actuating the gripping means being operable to close the gripping means on a plate at the second station after the said film has been lifted from the plate to enable the conveyor to index the plate to the third station and bring the next plate to the second station for exposure; and the window then being movable down to its lowered position for the pressing of the said film and the next plate and the exposure of said next plate through said film.

2. Apparatus as set forth in claim 1 wherein the means associated with the window for lifting the film away from the plate comprises means for vacuum-gripping a film to the bottom of the window.

3. Apparatus as set forth in claim 2 wherein the vacuum-gripping means comprises vacuum recesses in the bottom of the window, and means for drawing a vacuum in said recesses.

4. Apparatus as set forth in claim 3 wherein said vacuum recesses are constituted by a pattern of grooves in the bottom of the window and the vacuum gripping means comprises flexible vacuum line means connected to the window and in communication with the grooves.

5. Apparatus as set forth in claim 4 wherein the vacuum line means is connected to the top of the window and communicates with the grooves down through the window.

6. Apparatus as set forth in claim 1 wherein the means for actuating the gripping means on the conveyor at the second station is carried by the window.

7. Apparatus as set forth in claim 6 wherein the window has chambers receiving the gripping means on the conveyor at the second station when the window is down, the means for actuating the gripping means being mounted on said chambers.

8. Apparatus as set forth in claim 7 wherein the means for actuating the gripping means comprises air cylinders, one on each chamber, each extending up from the respective chamber and having a piston rod extending down into the chamber for actuating a respective gripping means.

9. Apparatus as set forth in claim 1 wherein the gripping means comprises sets of clamps, the sets being spaced at intervals along the length of the conveyor, each clamp of each set comprising a lower jaw and an upper jaw movable relative to the lower jaw between a lowered clamping position and a raised retracted position wherein it allows a film to be lifted vertically up and away from a plate.

10. Apparatus as set forth in claim 9 wherein the upper jaw of each clamp is swingable between its lowered and raised positions, extending generally vertically upward in its raised position.

11. Apparatus as set forth in claim 10 having air cylinders, one for each clamp of a set, carried by the window for actuating the upper jaws of the clamps at the second station.

12. Apparatus as set forth in claim 11 wherein the window has chambers receiving the clamps on the conveyor at the second station when the window is down, the air cylinders extending up from the chambers and each having a piston rod extending down into the respective chamber for actuating the upper jaw of the respective clamp.

13. Apparatus as set forth in claim 9 wherein the means associated with the window for lifting the film away from the plate comprises means for vacuum-gripping a film to the bottom of the window, the vacuum-gripped film being adapted to be lifted with the window vertically up and away from a plate when the upper jaws are in raised retracted position.

14. Apparatus as set forth in claim 13 wherein the vacuum-gripping means comprises vacuum recess means in the bottom of the window arranged for vacuum-gripping a film adjacent its border, and flexible vacuum line means connected to the top of the window and in communication with said vacuum recess means.

15. Apparatus as set forth in claim 1 further having means for holding a plate in the exposure position preventing it from being lifted with a plate.

16. Apparatus as set forth in claim 15 wherein said plate holding means comprises means for vacuum gripping a plate in the exposure position at the bottom face of the plate.

17. Apparatus as set forth in claim 1 having a flexible blanket at said exposure station, adapted on evacuating the space between the lowered window and the blanket for pressing a plate and film upwardly against the window, and means operable to hold a plate on the blanket to prevent it from being lifted with a film.

18. Apparatus as set forth in claim 17 wherein said plate holding means comprises means for vacuum gripping a plate on the blanket.

* * * * *